March 19, 1940.  J. MOORES  2,193,934
AERATING AGITATOR
Filed July 5, 1938  2 Sheets-Sheet 1

Joel Moores
INVENTOR

BY Frank Zugelter
ATTORNEY

March 19, 1940. J. MOORES 2,193,934
AERATING AGITATOR
Filed July 5, 1938 2 Sheets-Sheet 2

Joel Moores
INVENTOR
BY Frank Zugelter
ATTORNEY

Patented Mar. 19, 1940

2,193,934

UNITED STATES PATENT OFFICE 2,193,934

AERATING AGITATOR

Joel Moores, Cincinnati, Ohio, assignor to The J. H. Day Company, Cincinnati, Ohio, a corporation of Ohio Application July 5, 1938, Serial No. 217,326

9 Claims. (Cl. 261—93)

The present invention relates to an aerating agitator, beater or whip, such as may be employed for aerating a substance undergoing a mixing or whipping treatment. Inasmuch as whips and beaters properly are included in the category of agitators, it is to be considered that the use of the term agitator throughout this application, is meant to include kindred devices such as whips and beaters above referred to.

An object of the invention is to provide an improved means, included preferably in the agitator, for aerating substances undergoing a mixing operation or treatment.

Another object of the invention is to provide aerating means of the character mentioned, which will be found convenient and highly effective in the manipulation of the machine and its attachments with which the aerating agitator is associated.

Another object is to provide an agitator structure with a means of aerating the mixture, which means is simple, inexpensive, effective and capable of application to existing structures initially built without provisions having been made previously for aeration of the mix.

A further object of the invention is to provide an aerating means which does not interfere with ready placement and displacement of the mixing bowl or receptacle for the mixture, and which will not interfere with normal usage of the machine in the event that the air supply means be disabled or rendered inoperative by the operator for any particular reason.

The foregoing an other objects are attained by the means described herein and disclosed in the accompanying drawings, in which.

The advantages and reasons for the aeration of mixtures or substances such as batters, creams, egg whites and the like, are sufficiently well known to require no particular explanation herein. Accordingly, the disclosure will be directed to an explanation of the construction of a machine including an agitator whereby various mixes and substances may be aerated simultaneously with a mixing or beating operation.

Figure 1:
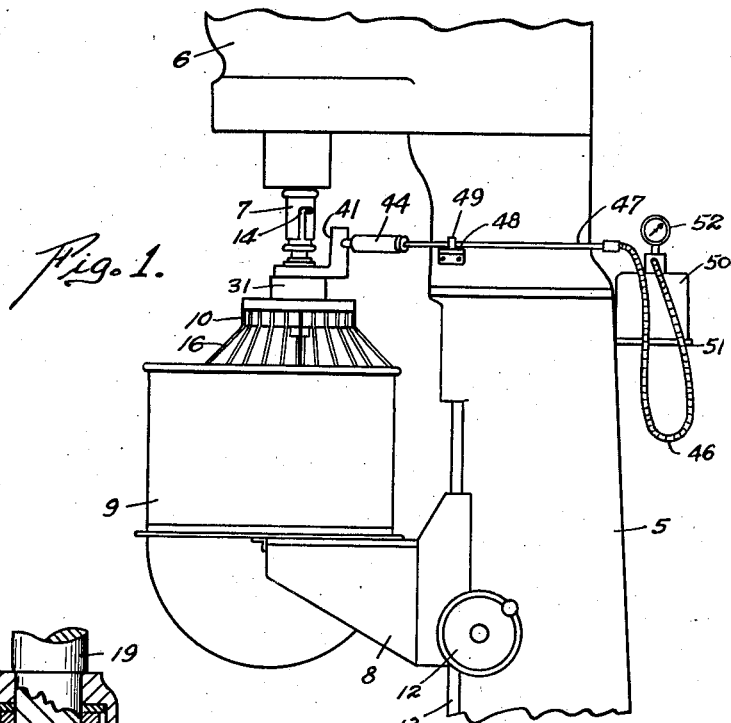
Fig. 1 is a fragmental elevational view of a mixer or beater machine embodying the present invention.

With reference to Fig. 1, 5 indicates generally a machine commonly known as a beater or mixer. The particular type of machine illustrated is immaterial to the present invention, but for the purpose of explanation, it may be stated that the head 6 includes the gearing necessary for either rotating or oscillating the agitator shaft 7. The machine may include also a carriage 8 for supporting a mixing bowl or receptacle 9 in position such that the agitator 10 may extend therein to perform the beating or mixing operation. The carriage may be elevated and lowered by means of a hand wheel 12 or its equivalent. The carriage preferably operates vertically along a rail or track 13 fixed to the front of the machine. Any suitable means, for example, a bayonet slot construction as indicated at 14, may be employed for quick detachment of the agitator from the driving shaft 7 of the machine. As will be understood, the quick detachable connection may take various forms since this particular structure is not considered an improvement over existing means for connecting the agitator to the shaft 7 of the machine.

Figures 2, 3:
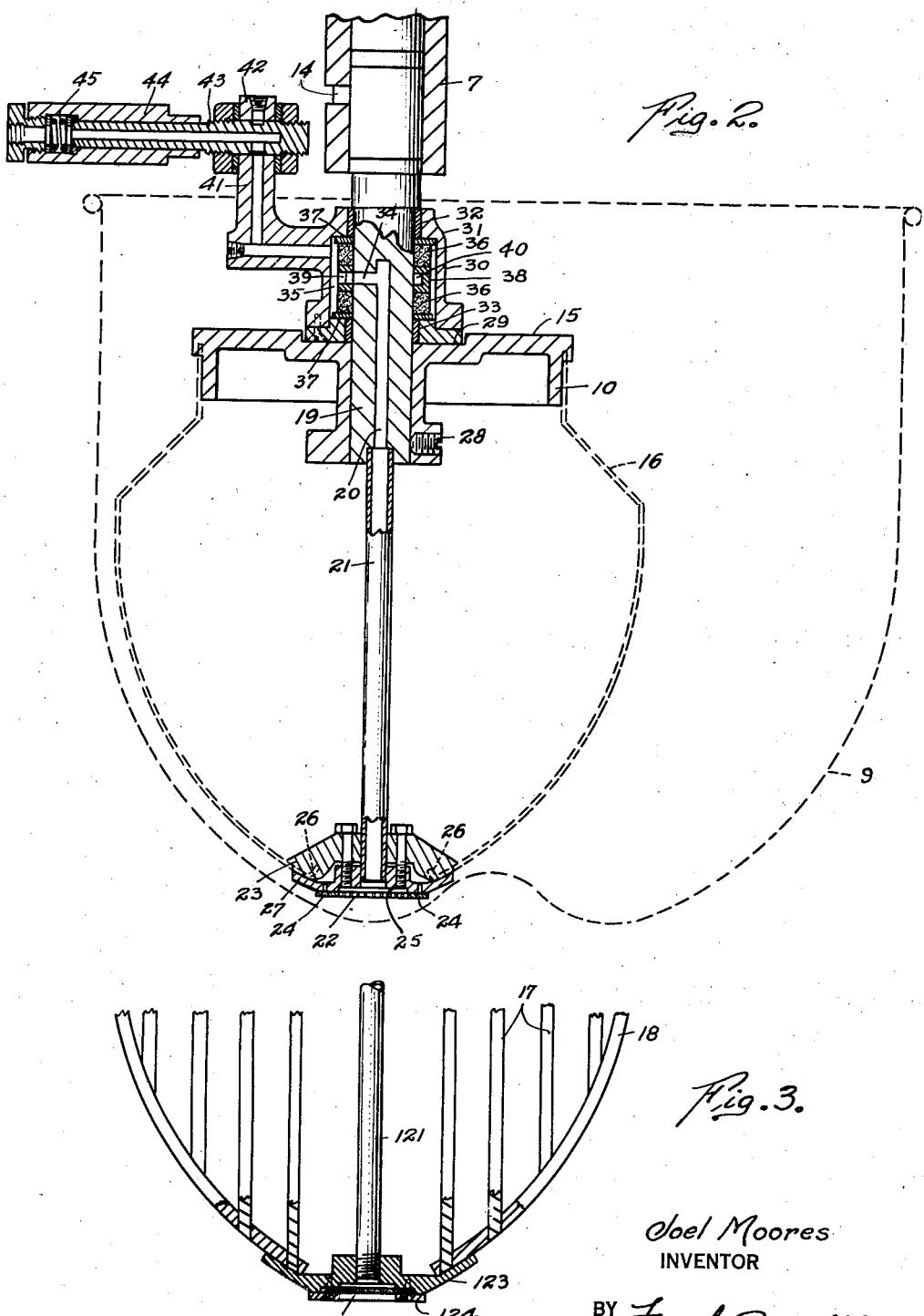
Fig. 2 is a vertical section taken through the agitator shown in Fig. 1, showing the outline of the receptacle in broken lines.
Fig. 3 is a fragmental elevational view, partly in cross-section, showing a modified form of agitator with the subject matter of the invention applied thereto.

Referring now to Fig. 2, 15 indicates the agitator head which supports the body 16. The body may be formed of a series of wires as shown in Figs. 1 and 2, or it may be built with a more rigid construction including rods or bars 17 supported upon a rigid frame 18, as illustrated in in Fig. 3. The body of the agitator usually is constructed in accordance with the requirements for the mixing or beating of the different types of substances fed to the receptacle.

The head 15 of the agitator may be furnished with a central shaft 19 having formed therein a longitudinal bore or passage 20 for the feed of air or other gas into a tube 21 extending downwardly from shaft 19 toward the lower end of the agitator. At the lower end of the agitator, the air is released to the mixes, preferably through a screen or grille 22 which may be bolted, riveted or otherwise fixed to the end piece 23, as indicated at 24. By preference, though not of necessity, the screen or grille 22 is formed larger than the lower end of the tube 21 and fits over a recess 25 formed in the bottom of the end piece, so that the air under pressure fed to the tube 21 will be released over an extended area at the lower face of the end piece 23. The characters 26 indicate the turned ends of the wires or rods which form the body of the agitator, said ends being held in place by the end piece plate 27, or otherwise.

The shaft 19 and the head 15 are caused to move in unison by reason of the connection at 28. At the upper face of the head 15, there may be formed an annular depression or recess 29 which provides a bearing for the air-cap 30. This air-cap preferably is in the form of a hollow sleeve 31 suitably bushed to the shaft 19 at the locations 32 and 33, so that the air-cap may remain stationary while the shaft 19 is power rotated during the mixing or beating operation.

The longitudinal bore 20 has one or more branches 34 extending laterally to the interior of the shaft, where it is placed in communication with the hollow interior 35 of sleeve 31. The sleeve is suitably packed by means of packing washers 36 and other washers 37, to preclude leakage of air along the exterior of the shaft. A hollow ring 38 may be employed to provide an annular air passageway, fed through the opening 39, so that in all positions of the lateral branch 34, air will be fed to the tube 21 and distributed at the lower end thereof. The hollow ring 38 preferably is stationary relative to the air-cap housing 31, and provides a support for the packing material at either side thereof. As shown, the hollow interior 40 of ring 38 is continuous about the shaft 19, however, by limiting the length of the passage formed thereby, the charging of the distributor with air may be rendered intermittent, if desired. As shown in Fig. 2, the passageway 40 extends all the way around shaft 19 to the location of the aperture or bore 39 which provides for entry of air under pressure from the space 35 to the hollow interior 40 of ring 38.

To accommodate the vertical movement of the bowl or receptacle 9 relative to the agitator structure, the air supply may be directed to the air-cap through an upstanding hollow neck 41, to the upper end 42 of which is mounted one member 43 of a coupling providing for quick detachment of an air line which supplies the necessary pressure of air. The second coupling member 44 cooperates with coupling member 43 to form the quick detachable means aforesaid. The coupling member 44 may include suitable springs and washers located within the recess 45, to preclude air leakage at the coupling and to yieldingly maintain a coupled relationship between the air hose and the air-cap of the agitator. The member 44 may be of such size as to furnish a hand grasp to manipulate for disengaging the couplings at such times as it may be desired to remove the agitator from the driving shaft 7.

It has been found desirable to provide the arrangement shown in Fig. 1, wherein the air supply hose 46 is of a flexible character, the remainder being in the form of a rigid tube 47 capable of being supported along the side of the machine, where it rests upon a suitable bracket 48, which bracket may or may not include a spring clip or the like 49 exerting a clamping action upon a rigid section 47. By means of the construction illustrated, the flexible section of the air supply means is kept clear of the agitator and its receptacle, while at the same time the air-cap is effectively precluded from any tendency to rotate with the shaft of the agitator. The arrangement is simple but nevertheless very effectual and convenient. The character 50 indicates a motor driven pump unit for supplying the required air under pressure. The unit may be mounted upon a bracket 51 fixed to the frame of the machine and a suitable gauge 52 may be supplied, when desired.

In accordance with the disclosure of Fig. 3, the tube 121 which extends centrally of the agitator, is arranged to form a structural element of the agitator, as well as a means of supplying air to a replaceable screen or mesh 122 located adjacent to the lower end of the tube. In the construction shown in Fig. 3, the agitator proper includes heavy members 17 and 18 as compared with the wires of the Fig. 2 agitator, and said members may be welded or otherwise joined together and to the end piece 123 of the agitator structure. A clamping ring 124 may serve as a means of holding the screen or mesh 122 in place. The upper end of the Fig. 3 agitator may be constructed as disclosed in Fig. 2.

Figure 4:
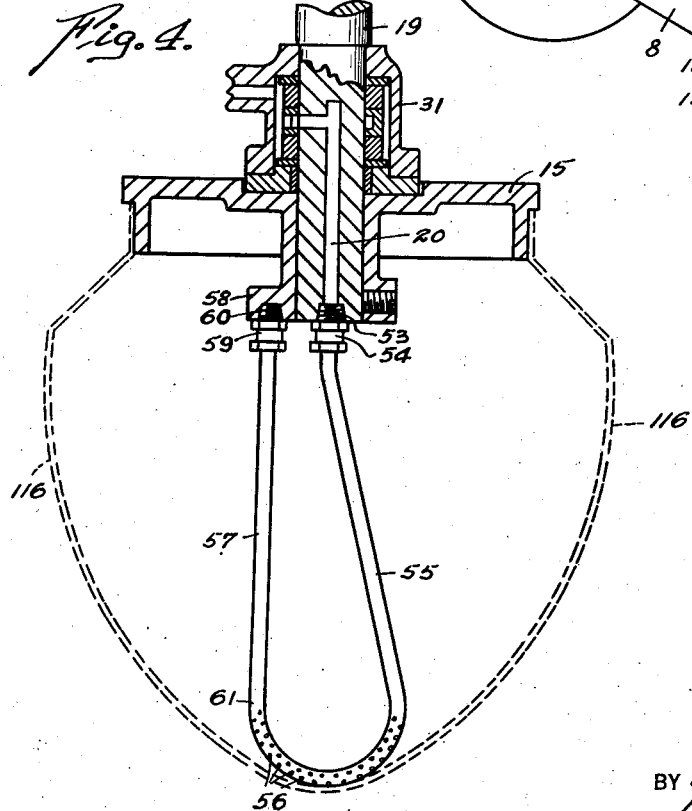
Fig. 4 is a vertical cross-sectional view similar to Fig. 2, showing a modified aerating means applied to the agitator.

In Fig. 4 is illustrated the same type of air-cap 31 as was described in connection with Figs. 1 and 2, but a different arrangement of distributor has been attached thereto. In accordance with Fig. 4, the lower end of the bore 20 is threaded as at 53 to receive a pipe coupling 54, there being supported by said coupling a length of tubing 55 bent upon itself to provide a U. Approximately midway between the ends of the tube 55, and where the tube extends to the lower end of the agitator, a series of perforations 56 may be furnished for the release of air under pressure into the mix near the lower end of the agitator. The upwardly directed leg 57 of the U-shaped tube may be fixed to an extension 58 of the agitator head 15, and for this purpose it is convenient to use a second coupling member or nipple 59 which may be mounted in a blind threaded hole 60 formed in the extension 58. It is immaterial whether or not the lower connecting portion of the U-shaped tube is fixed to the lower end of the agitator. If the tube is made sufficiently rigid, fixation in the region of the apertures 56 is unnecessary. Also, the particular shape of the apertures 56 is of no material consequence. It will readily be observed that removal and replacement of tubes such as 55 readily may be effected by simply reaching into the cage formed by the wires or rods 116, and unscrewing the coupling members 54 and 59 so that the entire assembly may be withdrawn through the spaces between the wires indicated at 16 of Fig. 1.

Except for the advantage of structural strength in supplying the coupling 59 for supporting the upstanding arm 57 of the tube 55, it is immaterial whether the tube be terminated and capped close to the series of openings at a location such as 61. Moreover, the leg of the tube which extends downwardly from the coupling 54 may be aligned with the bore 20 of shaft 19, and furnished with a hollow distributor head to take the place of the apertures 56, which head may be fixed to the agitator, or not, as desired. Various other modifications and changes may be made in the structural details of the device, within the scope of the appended claims, without departing from the spirit of the invention.

What is claimed is:

1. In combination, an agitator drive member, and an agitator including means for removably mounting the agitator upon said drive member, said agitator comprising a head and an end piece in spaced apart relationship, said head including a longitudinally bored upstanding stud detachably fixed to the head and having a laterally extended branch bore, an air cap rotatably mounted upon the agitator head, encircling the upstanding portion of the stud above the agitator head and having a hollow interior communicating with the branch bore, a pump operative under conditions of movement and of rest of the agitator, for feeding a gaseous medium under pressure to the air cap interior, and tubular means in communication with the bore of the stud for conveying said gaseous medium from the air cap to the vicinity of the end piece, where the gaseous medium is exhausted.

2. In a rotating agitator, the combination of a head and a body having a lower end, a hollow stud upstanding on the head of the agitator and including a transverse bore extending from the hollow interior of the stud to the exterior thereof, a hollow air cap rotatably mounted upon said stud and comprising bearing surfaces disposed at opposite sides of the transverse bore providing for rotation of the stud within the bearing surfaces of the cap, means for delivering air under pressure to the interior of the cap, and a tube extending from the hollow stud to the lower end of the agitator body for conveying the air under pressure to said lower end.

3. In a rotating agitator, the combination of a head and a body having a lower end, a hollow stud upstanding on the head of the agitator and including a transverse bore extending from the hollow interior of the stud to the exterior thereof, a hollow air cap rotatably mounted upon said stud and comprising bearing surfaces disposed at opposite sides of the transverse bore providing for rotation of the stud within the bearing surfaces of the cap, air supply means for delivering air under pressure to the interior of the cap, a tube extending from the hollow stud to the lower end of the agitator body for conveying the air under pressure to said lower end, said air supply means comprising a tube having a connector quickly attachable and detachable relative to the hollow air cap, the tube serving, when attached, for precluding rotation of the air cap as the agitator is rotated.

4. In a rotating agitator, the combination of a head and a body having a lower end, a hollow stud upstanding on the head of the agitator and including a transverse bore extending from the hollow interior of the stud to the exterior thereof, a hollow air cap rotatably mounted upon the agitator and comprising bearing surfaces disposed at opposite sides of and confining the transverse bore to establish air communication between the hollow interior of the stud and the hollow interior of the cap, air supply means for deliverying air under pressure to the interior of the cap, a tube extending from the hollow stud to the lower end of the agitator body for conveying the air under pressure to said lower end of the agitator, said air supply means including a rigid tube having a quick-action detachable connection with the air cap, said tube being anchorable remotely from the agitator to preclude rotation of the air cap along with the agitator when the latter is driven.

5. A machine of the character described, comprising in combination a frame including a standard and an overhanging driving head, a rotatable driving element on the head, and an agitator detachably mounted upon said driving element for rotation therewith, said agitator including a hollow air cap rotatable relative to the agitator and to the machine frame, a source of air under pressure, and means for conveying the air to the agitator, said means comprising a section of flexible conduit and a length of rigid tubing, the latter being attachable to the air cap of the agitator, and the flexible conduit being remote from the agitator, and means on the frame of the machine for removably supporting the length of rigid tubing while the tubing restrains the air cap against rotation with the agitator.

6. A machine of the character described, comprising in combination a frame including a standard and an overhanging driving head, a rotatable driving element on the head, and an agitator detachably mounted upon said driving element for rotation therewith, said agitator including a hollow upstanding stud rotatable therewith, and an air delivery tube leading from the interior of the stud to a remote portion of the agitator, a hollow air cap mounted upon the agitator in loosely encircling relationship to the stud and having its interior in communication with the hollow interior of the agitator stud, and means for conveying air under pressure to the air cap interior, said means comprising a length of rigid tubing detachably connected to the air cap in fluid communicating relationship thereto, and means on the frame of the machine removably supporting said rigid tubing to preclude rotation of the air cap with the agitator.

7. A machine of the character described, comprising in combination a frame including a driving head and a rotatable driving shaft, an agitator shaft and means at its upper end for detachably connecting the agitator shaft to the driving shaft for rotation therewith, aerating means on the agitator shaft including an air distributor conduit, and an air cap in fluid communicating relationship thereto, means mounting said air cap upon the agitator for possible rotational movement relatively thereto, said means precluding longitudinal shifting of the air cap relative to the agitator shaft upon displacement thereof from the driving shaft, and an air supply means detachably connected to the air cap and arranged to arrest rotation of the air cap with the agitator shaft when the latter is driven.

8. A machine of the character described, comprising in combination a frame including a driving head and a rotatable driving shaft, an agitator shaft and means at its upper end for detachably connecting the agitator shaft to the driving shaft for rotation therewith, aerating means on the agitator shaft including an air distributor conduit, and an air cap in fluid communicating relationship thereto, means mounting said air cap upon the agitator shaft for possible rotational movement relatively thereto, said means precluding longitudinal shifting of the air cap relative to the agitator shaft upon displacement of the agitator shaft from the driving shaft, a stop associated with the air cap for normally precluding rotation of the air cap with the rotating agitator shaft, and means for supplying air under pressure to the air cap and the distributor conduit associated therewith.

9. In a mixing machine, the combination with an agitator drive member, of an agitator including a fixed upstanding stud at its upper end and means at said upper end for quick detachament and interchangeability of the stud relative to the drive member, said stud being bored longitudinally and having a lateral branch bore to provide an air passage terminating at the lower end of the stud for directing air toward the lower end of the agitator, an air cap in the form of a sleeve loosely surrounding the stud intermediate its ends, and communicating with the branch bore of the stud, means for precluding longitudinal shifting movement of the loosely mounted air cap upon the stud, means external to the air cap for generating a pressure of air, and including a quick detachable connection with the air cap, whereby the cap is rendered bodily displaceable along with the agitator upon breaking the quick detachable connection last mentioned.

JOEL MOORES.